United States Patent [19]

Macholdt et al.

[11] Patent Number: 4,786,575
[45] Date of Patent: Nov. 22, 1988

[54] PIGMENT FOR ELECTROPHOTOGRAPHIC RECORDING PROCESSES

[75] Inventors: Hans-Tobias Macholdt, Darmstadt; Alexander Sieber, Frankfurt am Main; Helmut Tröster, Königstein, all of Fed. Rep. of Germany

[73] Assignee: Hoechst Aktiengesellschaft, Frankfurt am Main

[21] Appl. No.: 6,509

[22] Filed: Jan. 22, 1987

[30] Foreign Application Priority Data

Jan. 25, 1986 [DE] Fed. Rep. of Germany ....... 3602182

[51] Int. Cl.$^4$ .............................................. G03G 9/08
[52] U.S. Cl. ..................................... 430/109; 430/114
[58] Field of Search ................ 430/106, 107, 109, 114

[56] References Cited

U.S. PATENT DOCUMENTS 2,221,776  11/1940  Carlson .............................. 430/120

FOREIGN PATENT DOCUMENTS 0042816   12/1981  European Pat. Off. .
59-197049  8/1984  Japan .
59-219756 11/1984  Japan .
59-220750 12/1984  Japan .

Primary Examiner—John L. Goodrow

[57] ABSTRACT

Colorant for electrophotographic recording processes which is composed of mix-crystals of 99-70 parts of a compound of the following formula I and 1-30 parts of a compound of the following formula II

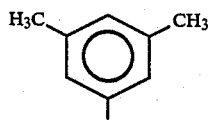

I

-continued

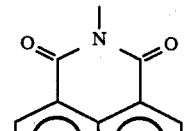

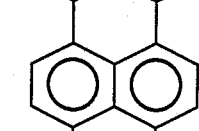

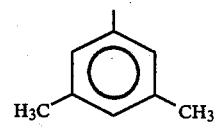

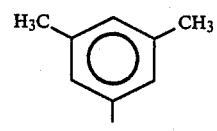

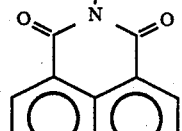

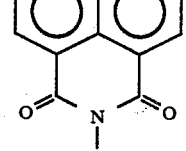

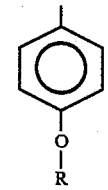

II where R in formula II denotes a $C_1$–$C_4$-alkyl group, and the use thereof for preparing toners or developers which are used for the electrophotographic copying or duplicating of originals and for printing electronically, optically or magnetically stored information.

2 Claims, No Drawings

PIGMENT FOR ELECTROPHOTOGRAPHIC RECORDING PROCESSES

The present invention relates to a novel pigment for electrophotographic recording processes which is composed of mix-crystals of pigments based on substituted N,N'-diphenylperylenetetracarbimides.

The present invention had for its object to find pigments for electrophotographic recording which have improved properties for said application and are composed of not more than two components.

In electrophotographic recording, a "latent charge image" is generated, for example on a photoconductor drum. This is accomplished by charging up the photoconductor drum by means of a corona discharge and by subsequent imagewise exposure of the electrostatically charged surface of the photoconductor drum, causing the charge to flow off in the exposed areas to the earthed support. Subsequently the "latent charge image" thus generated is developed by applying a toner.

In a subsequent step, the toner is transferred from the photoconductor drum to, for example, paper, textiles, foils or plastics material and fixed thereon, for example by pressure, radiation, heat or solvent action. The photoconductor used is subsequently cleaned and is available for a new recording process.

Numerous patent specifications describe the optimization of toners, the subjects studied including the effects of the toner binder (variation of resin/resin components or wax/wax components), the effect of charge control agents or other additives or the effect of carriers (in the case of two-component developers) and magnetic pigments (in the case of one-component developers) (U.S. Pat. No. 2,221,776).

A measure of toner quality is its specific chargeability Q/M (charge per unit mass).

The patent literature discloses the use of numerous organic pigments and dyes of different classes, such as, for example, monoazo, disazo, benzidine, copper phthalocyanine and perylenetetracarboxylic acid derivatives, for coloring toners for colored copies or prints.

To prepare red toners, practical experience has shown that in addition to laked or unlaked monoazo pigments, such as, for example, C.I. Pigment Red 48 (15,865), in particular perylenetetracarboxylic acid derivatives, such as C.I. Pigment Red 149 (71,137), are suitable. This use of the high-grade C.I. Pigment Red 149 is advantageous not only on account of its superior fastness properties, but in particular on account of its good triboelectric behavior in red toners.

A further improvement of toners is described in Japanese Preliminary Published Application Nos. 59/219,756 and 59/220,750. The former describes a red toner which gets its favorable toner properties from containing a mixture of, for example, C.I. Pigment Red 149 and C.I. Pigment Red 222. (The pigment mixtures in toners are merely the result of mingling the pigments in toner binders.) According to the latter Japanese Preliminary Published Application, by employing a mixture of C.I. Pigment Red 149 and C.I. Pigment Red 177 (65,300) an analogous favorable effect is achieved.

According to Japanese Preliminary Published Application No. 59/197,049, certain substituted perylenetetracarboxylic acid derivatives are added to the toner to improve the triboelectric chargeability. Although it remains open whether by means of an addition of this type it is possible to surpass the standard of C.I. Pigment Red 149, an addition of this type is somewhat problematical insofar as the already complex toner recipes must be further lengthened by at least one constituent, and, as a consequence, pigment incompatibilities, mixing problems and shade differences must be taken into account.

A more recent development is the use of mix-crystals of organic pigments in the preparation of electrophotographic toners. For instance, European Offenlegungsschrift No. 0,042,816 describes the suitability of "pigment alloys" for toners in the field of electrophotography. "Pigment alloys" is here understood as meaning mix-crystals which are obtained by intimately grinding pigments of two completely different pigment classes (for example C.I. Pigment Yellow 110 (an isoindolenine pigment) and perylenetetracarbimide).

Against that it has now been found, surprisingly, that mix-crystals based on certain N,N'-diphenylperylenetetracarbimides are more highly suitable for use as pigments for electrophotographic recording processes than the mix-crystals known for this purpose in that the preparation of a suitable and highly active toner for the purpose in question requires merely a two-component system composed of toner binder (polymer) and pigment (mix-crystal) but no charge control agent or merely a restricted amount of an additional charge control agent, since the coloring mix-crystal additionally performs the function of the charge control agent, which fact constitutes a large simplification compared with known toners, which are composed of three or more constituents.

The mix-crystals used according to the invention surprisingly also have more pronounced triboelectric properties than C.I. Pigment Red 149.

The present invention thus provides a pigment for electrophotographic recording processes which is composed of mix-crystals based on 99-70 parts of compound of the following formula I and 1-30 parts of compound of the following formula II

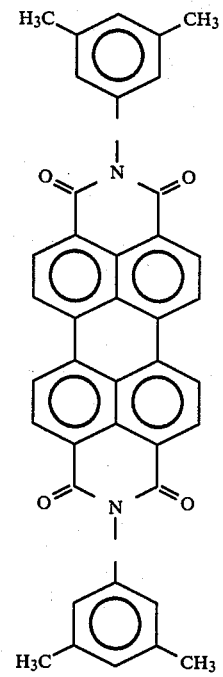

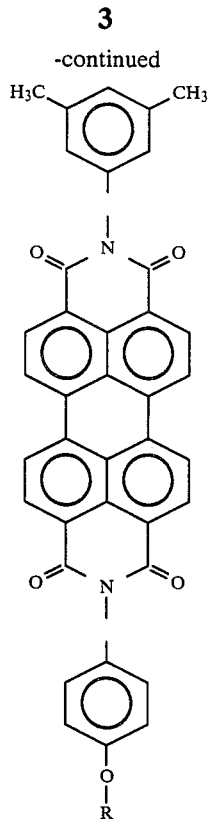

where R in formula II is a $C_1$–$C_4$-alkyl group, in particular the use thereof for producing toners which are used for the electrophotographic copying or of originals and for printing electronically, optically or magnetically duplicating stored information.

The mix-crystals pigments on which the pigments according to the invention are based and/or the preparation thereof are described in German Patent Application P No. 34 36 206.1 and P No. 34 36 208.8.

If it is possible with the pigments according to the invention to dispense completely with the addition of a separate charge control agent, which should otherwise be added as a third constituent in the toner preparation, the problems which can arise on adding a charge control agent, such as undesirable effect on the hue by inhomogeneous distribution of the charge control agent in the toner or gradual migration of the charge control agent out of the toner, can be completely avoided. If the addition of a separate charge control agent is not completely dispensable, then it is nonetheless possible to reduce the problems mentioned.

The level of the electrostatic charge buildup on the toner using mix-crystals of compounds of the above-mentioned formulae (I) and (II) in the stated mixing ratio was measured on standard systems under identical conditions (such as identical dispersing times, identical particle size distribution, identical particle shape) at 23° C. and 50% relative humidity. The activation of the toner in a two-component developer is effected by mingling the toner with a carrier (3 parts of toner for every 97 parts of carrier) on a roll mill (150 revolutions per minute) for 30 minutes.

The following examples serve to illustrate the invention without restricting it thereto. The parts are by weight.

EXAMPLE 1

5 parts of pigment (mix-crystal of the compounds of the abovementioned formulae I and II ($R = C_2H_5$) in a mixing ratio of about 90:10) were dispersed by means of a kneader from Werner & Pfleiderer (Stuttgart) in 95 parts of toner binder (($^R$)Dialec S 309 from Diamond Shamrock (styrene-methacrylic copolymer)) in the course of 90 minutes. This was followed by milling on a laboratory universal mill 100 LU from ALPINE (Augsburg) and thereafter by classifying on a centrifugal sifter 100 MZR from ALPINE. The particle fraction 4–25 μm was activated with a carrier of (90:10) styrene-methacrylate coated magnetite particles of size 50–200 μm of type 90 μm Xerographic Carrier from PLASMA MATERIALS INC. The triboelectric chargeability was measured on a customary Q/M measurement stand [cf. J. H. Dessauer, H. E. Clark "Xerography and related processes", Focal Press, N.Y. 1965, page 289].

The Q/M value was found to be $-18.9$ μC/g.

EXAMPLE 2

Example 1 was repeated, except that the pigment used was a mix-crystal of the compounds of the abovementioned formulae I and II ($R = C_2H_5$) in a mixing ratio of about 97:3.

The Q/M value was found to be $-17.2$ μC/g.

EXAMPLE 3

Example 1 was repeated, except that the pigment used was C.I. Pigment Red 149 (prepared as described in Example 1 of German Pat. No. 1,067,157).

The Q/M value was found to be $-7.1$ μC/g.

We claim:

1. An electrophotographic toner containing a binder and mix-crystals of 99-70 parts of a compound of the following formula I and 1-30 parts of a compound of the following formula II

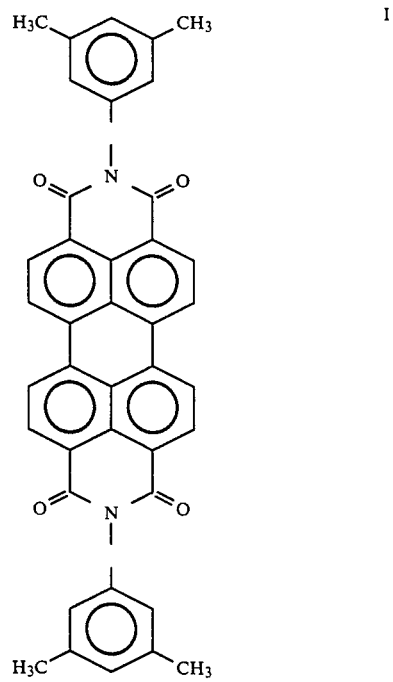

-continued
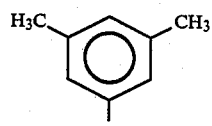
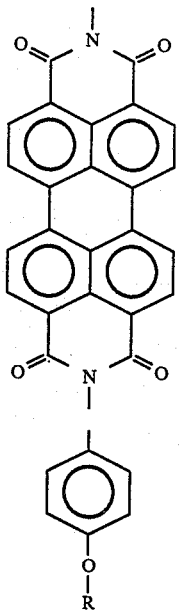
where R in formula II denotes an $C_1$–$C_4$-alkyl group, as a pigment.
2. Use of the pigment mentioned in claim 1 for preparing toners or developers which are used for the electrophotographic copying or duplicating of originals and for printing electronically, optically or magnetically stored information.
* * * * *